US005734486A

United States Patent [19]
Guillemot et al.

[11] Patent Number: 5,734,486
[45] Date of Patent: Mar. 31, 1998

[54] OPTICAL PACKET SWITCHING SYSTEM

[75] Inventors: Christian Guillemot, Perros-Guirec; Slimane Loualiche, Lannion; Fabrice Clerot, Louannec, all of France

[73] Assignee: France Telecom, France

[21] Appl. No.: 552,014

[22] Filed: Nov. 2, 1995

[30] Foreign Application Priority Data

Nov. 4, 1994 [FR] France .................. 94 13202

[51] Int. Cl.$^6$ ...................... H04J 14/08
[52] U.S. Cl. ............ 359/139; 359/123; 359/117; 359/140
[58] Field of Search ................. 359/123, 117, 359/130, 139, 140; 370/63, 64, 60.1, 94.1, 60, 352–353, 369, 355–356; 340/825.79, 825.8; 385/16, 17

[56] References Cited

U.S. PATENT DOCUMENTS

| | | | |
|---|---|---|---|
| 4,912,706 | 3/1990 | Eisenberg et al. | 370/105 |
| 5,005,167 | 4/1991 | Arthurs et al. | 370/4 |
| 5,101,455 | 3/1992 | Goutzoulis | 385/24 |
| 5,369,514 | 11/1994 | Eilenberger et al. | 359/123 |

FOREIGN PATENT DOCUMENTS

| | | | |
|---|---|---|---|
| A-0 282 071 | 3/1988 | European Pat. Off. | H04Q 3/52 |
| A-0 334 054 | 2/1989 | European Pat. Off. | H04L 11/20 |
| A-0 335 562 | 3/1989 | European Pat. Off. | H04L 11/20 |
| A-0 503 464 | 3/1992 | European Pat. Off. | H04Q 11/00 |
| A-0 547 836 | 12/1992 | European Pat. Off. | H04Q 11/00 |
| A-0 574 864 | 6/1993 | European Pat. Off. | H04Q 11/00 |
| A-2 672 172 | 1/1991 | France | H04J 14/08 |

OTHER PUBLICATIONS

OFC/100C '93 Technical Digest, Race 2039–ATMOS: The Fiber Loop Memory Switch, pp. 19 and 20.
Electronics Letters, Mar. 3, 1994, vol. 30, No. 5, pp. 435 and 436.
Effects of Output Buffer Sharing on Buffer Requirements in an ATDM Packet Switch, IEEE, 1988, pp. 459–466.
Photonic Switching II, Proceedings of the International Topical Meeting, Kobe, Japan, Apr. 12–14, 1990, pp. 296–299.
Commutation & Transmission, Very High Bit Rate Optical Switch for ATM Applications, No. 2, 1994, pp. 5–14.
Optical Fiber Communication Conference, 1992 Technical Digest Series, vol. 5, conference edition.
Conference Record, IEEE International Conference on Communications 1993, 22–26, May 1993, vol. 1, pp. 578–583.

Primary Examiner—Kinfe-Michael Negash
Attorney, Agent, or Firm—Blakely Sokoloff Taylor & Zafman

[57] ABSTRACT

An optical signal switch identifies the routing of each optical packet, directs each packet arriving at any input to the output corresponding to the routing, and includes delay lines through which the optical signals pass selectively. The switch has three stages: a first stage directing each optical packet received at an input to a chosen delay line, a second stage coupled to the output of the delay lines to direct the optical packets selectively to the output corresponding to the determined routing, and an output third stage.

49 Claims, 7 Drawing Sheets

5,734,486

OPTICAL PACKET SWITCHING SYSTEM

BACKGROUND OF THE INVENTION

1. Field of the Invention

The present invention concerns optical communications.

To be more precise, the present invention concerns optical signal switching devices.

The use of optical signals to convey information offers very interesting prospects.

In particular, the bandwidth, attenuation and insensitivity to electromagnetic interference properties of optical fibers allow the implementation of very high bit rate transmission systems offering very high transmission quality. Moreover, the recent development of optical components such as semiconductor or doped fiber optical amplifiers and wavelength converters makes it feasible to consider the expansion of the role of optical technology from point-to-point transmission to high bit rate telecommunication networks by virtue of the efficient sharing of the bandwidth of the optical fiber ($\approx 10$ terahertz) between a plurality of users.

Fiber optic telecommunication networks require various signal processing means at the nodes of the network, including "switches", i.e. means for orienting an input optical signal arriving at one of a plurality of inputs to a selected one of a plurality of available output channels.

Optical signal switches will definitely be an essential component of optical telecommunication networks of the future.

All international carriers and equipment manufacturers are at present working very actively on optical communications.

Many proposals have already been made for fast switching of optical signals.

In particular, many types of switch have already been proposed that allow routing of information in optical form, without opto-electronic conversion, in an optical network, between a sender and a receiver.

To be even more precise, the present invention is directed to the field of networks designed to transmit optical signals organized into packets.

The optical packets to be switched usually each include a header or routing address and a payload. The header contains information relating to the routing of the packet such as the address of the destination, service and administration information and an error correcting code.

The absence of true optical memory gives rise to two types of problem in transparent optical switches, i.e. switches with no opto-electronic conversion.

Firstly, information cannot be stored, merely delayed by fiber optic delay lines. Address conflicts that occur if a plurality of packets require to access the same output simultaneously have to be resolved using these delay lines.

Secondly, the absence of memory is accompanied by the absence of payload bit regeneration. The payload is therefore continuously degraded in terms of the signal to noise ratio as it passes through active components, representing a de facto limitation on the effective transparency of the switch.

2. Description of the Prior Art

There is already an abundant literature on optical switches.

The document by J. B. Jacob, J. M. Gabriagues, "Very high bit rate optical switch for ATM applications", Commutation & Transmission No 2, 5 (1994) describes an ATM (Asynchronous Transfer Mode) packet optical switch, for example. The design of this switch solves output address conflict problems after effecting a choice of output by means of wavelength conversion. After being coded at a wavelength corresponding to their destination, the packets in conflict access Q fiber optic delay lines via a Banian type network constructed from optical gates. This network comprises N couplers with one input and Q outputs, N.Q optical ports and Q couplers with N inputs and one output. Each delay line can carry several wavelengths at once. The outputs of the delay lines are connected to the inputs of a star coupler the outputs of which are fed to the respective outputs of the switch via dedicated optical filters. Because of deterioration of the signal in the network providing access to the delay lines, the maximal value of the time-delay is sixteen mimes the duration of an optical packet or "packet time" This value does not allow a packet loss rate that is sufficiently low to be compatible with the criteria adopted for electronic switching in ATM mode. Moreover, the deterioration of the signal is such that it is impossible for the same packet to pass through several switches in succession, which rules out the design of a transparent optical packet network.

The document by S. Kuroyanagi "Photonic ATM Switching Network", reference 14B2 of Topical Meeting on Photonic Switching, Kobe, Japan, 12–14 April 1990, describes a photonic switching matrix including: a) an input interface module at each of the $\underline{n}$ inputs of the matrix for identifying the cells arriving at that input by reading a virtual channel or virtual circuit group label contained in the cell header, and for converting the wavelength of each cell into a wavelength corresponding to an output of the matrix; b) cell selectors each comprising a diffuser and a filter, for distributing the cells to the outputs of the matrix according to their wavelength; and c) an optical buffer member for each output for storing cells addressed to the same output and that may be in conflict for access to that output. To be more precise, each of these buffer memories includes $\underline{n}$ optical memories having a capacity equal to one cell and that may comprise an optical delay line and an n×m switch using the principle of spectral division switching. This n×m switch includes wavelength converters to convert the wavelength of each cell, cell by cell, a combiner, a diffuser and filters that can be tuned to route each cell into one of the optical memories. The optical memories being connected in series, they enable the implementation of a time-delay between 0 and $\underline{m}$ times the duration of a cell.

The document FR-A-2 672 172 describes another variant based on the same principle of a photonic switching matrix having $\underline{n}$ inputs and $\underline{n}$ outputs to switch data in the form of fixed length cells asynchronously time-division multiplexed onto optical fibers, including:

- a plurality of wavelength converters at respective inputs of the matrix to assign a wavelength to each cell applied to an input of the matrix,
- an optical buffer memory common to all the outputs of the matrix for storing each cell for a time that can be selected between 0 and k.T where $\underline{k}$ is an integer and T is the duration of a cell,
- a space switching stage including a filter for each output of the matrix, allowing only cells having a given wavelength to be passed to a given output,
- control means for controlling the converters and the buffer memory on the basis of routing information indicating, for each cell, the output of the matrix to which the cell is addressed, and for selecting the storage time of each cell in the buffer memory in such a way as to constitute a queue for each output, avoiding conflict between two cells to be switched to the same output, in which the buffer memory includes:

- k+1 delay lines providing respective time-delays from 0 through k.T and having outputs coupled to inputs of the space switching stage,
- k+1 combiners each having n inputs and an output coupled to an input of a delay line,
- n diffusers each having an input constituting an input of the buffer memory and k+1 outputs,
- (k+1).n optical gates each connecting one output of one of the n diffusers to one input of one of the combiners and being controlled by the control means in such a way that each diffuser is connected to only one combiner at any given time.

The document U.S. Pat. No. 5,005,167 and the document TECHNICAL DIGEST, OPTICAL FIBER COMMUNICATION CONFERENCE, 2–7 February 1992, vol. 5, page 58, San Jose, U.S., XP341592, A. Cisneros "Large scale ATM switching and optical technology" describe an optical switch comprising a set of senders/coders on a given wavelength associated with respective inputs, a star coupler and a set of receivers/decoders tuneable to a specific wavelength at the output. Address conflicts are managed by rerouting according to available outputs.

The document by M. CALZAVARA et al. "Optical-fiber-loop memory for multiwavelength packet buffering in ATM switching applications", OFC 93, San Jose, U.S.A., 1993 describes a recirculating memory. This memory includes an optical fiber loop corresponding to a time-delay equal to a "packet time". Each circuit in the loop delays the optical packet by a "packet time" at the cost of passage through a 2×2 passive coupler and a semiconductor optical amplifier. Deterioration of the signal in this loop limits the number of circuits to 12, whereas a loss rate of $10^{-9}$ would require around 50.

The same type of memory was very recently proposed in the document by W. PIEPER "Investigation of crosstalk interference in a fiber loop optical buffer", Electronics Letters 28, 435 (1994), with different operating conditions of the optical amplifier. The number of circuits of the packet experimentally demonstrated has been increased to 23, with very strong indications that this number could be increased up to 40. Here again, the deterioration of the signal is such that a waiting time in the order of 50 "packet times" would seem difficult to achieve and in any event raises the problem of the cascadability of such recirculating loops and therefore of the switches that they might support.

The document by A. E. Eckberg et al., "Effects of output buffer sharing on buffer requirements in an ATDM packet switch", INFOCOM' 88, 459, 1988 proposes a mathematical analysis for evaluating the distribution of the number of output gates occupied at a given arbitrary time in an optical packet switching system conforming to the ATDM (Asynchronous Time Division Multiplexing) format, based on sharing the common memory between the output gates.

The documents EP-A-0 335 562 and EP-A-0 574 864 describe switches comprising means for accumulating optical packets that have to follow the same route through the network, means for compacting the resulting aggregates and, at each output, means for expanding the aggregates and separating the various packets.

The document U.S. Pat. No. 4,912,706 describes another switch variant in which packets grouped according to their destination are applied to an input/output matrix formed of couplers such that each input can be coupled to any chosen output.

The documents EP-A-0 282 071 and EP-A-0 334 054 describe optical switch matrices controlled by an electronic control module.

The document EP-A-0 223 258 describes a switch comprising an input optical multiplexer followed by a first wavelength switching stage and a space switching stage the output of which is associated with a second wavelength switching stage connected to an output optical multiplexer. The wavelength switching stages and the space switching stage are controlled by a central processor. The system further comprises a generator comprising an output multiplexer adapted to generate a plurality of reference wavelengths.

An aim of the present invention is to improve the known optical packet switches.

A main aim of the present invention is to propose an optical packet switch that can resolve address conflicts by means of delay lines such that the number of active components seen by the payload is minimized.

Another aim of the present invention is to propose an optical packet switch conforming to the criteria defined for asynchronous transfer mode (ATM) packet networks, namely: a packet loss rate of less than $10^{-9}$ for an average probability of the presence of packets per input port of less than 0.8, the successive arrival of packets at the various input ports being uncorrelated with each other and with time.

SUMMARY OF THE INVENTION

These aims are achieved in accordance with the present invention by an optical switch having N inputs and P outputs for optical signals organized into packets each comprising a header containing information relating to the routing of each packet and a payload, which switch comprises:

- means for reading the header of each optical packet and for identifying the corresponding routing,
- orientation and coupling means for directing each packet arriving at any input to the output corresponding to the routing determined by the header of the packet, and
- delay lines through which the optical signals pass selectively in order to manage routing conflicts arising when a plurality of packets require access to the same output simultaneously, which device comprises three stages:

- a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of the X sets,
- a space switching second stage coupled to the output side of the delay lines from the first stage and adapted to direct the optical packets selectively to the output corresponding to the routing determined by the header of each packet, and
- an output third stage.

The third stage can be completely passive. Alternatively, the third stage can if necessary be adapted to define the time order of the packets accessing a common output, after the second stage.

Other features, aims and advantages of the present invention will emerge from a reading of the following detailed description given by way of non-limiting example and with reference to the appended drawings.

DETAILED DESCRIPTION OF THE FIRST PREFERRED EMBODIMENT (FIG. 1)

Figure 1:
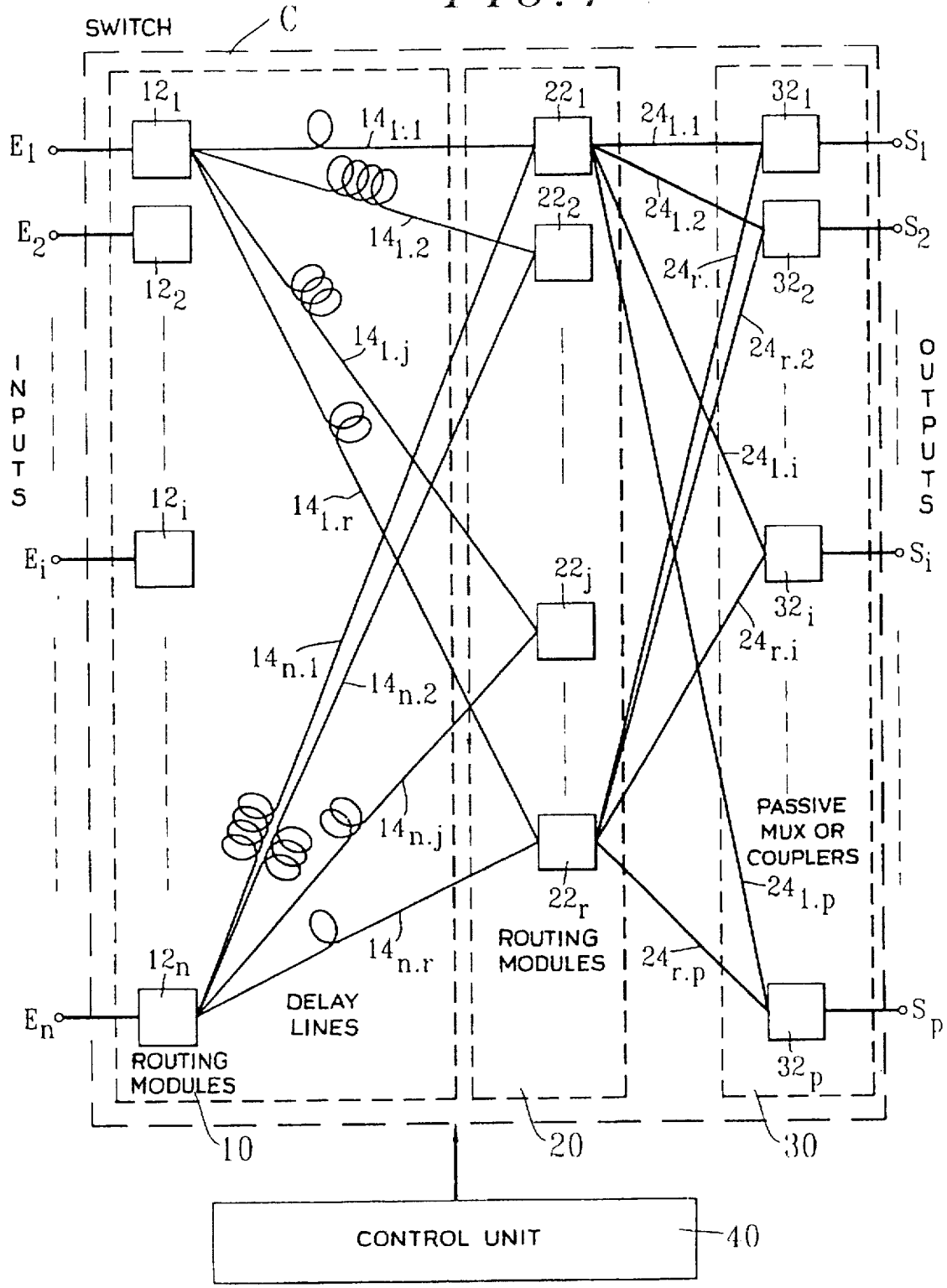
FIG. 1 is a block diagram of an optical switch in accordance with the present invention.

The general structure of the switch shown in FIG. 1 is described first.

The optical packet switch C in accordance with the present invention shown in FIG. 1 comprises N inputs E1, E2, ..., Ei, ..., En and P outputs S1, S2, ..., Si, ..., Sp. As already mentioned, it is possible for P to be equal to N, although this is not mandatory. P can be different than N, in particular P>N. The switch C is organized as a Clos network. This network includes three stages 10, 20, 30 and a pseudo-random access memory.

To be more precise, the time switching first stage 10 comprises N routing modules $12_1$ through $12_n$ and N groups of $r$ delay lines 14. Each delay line 14 is preferably in the form of an optical fiber. The N groups of $r$ delay lines 14 are respectively associated with the N routing modules 12. The N routing modules $12_1$ through $12_n$ have their input connected to a respective input E1 through En and are adapted to direct each optical packet received at an input E1 through En to a delay line 14 chosen from the $r$ lines 14 accessible at the output of each module $12_1$ through $12_n$.

As will emerge below in connection with FIG. 2, the first stage 10 can also be a space switching stage in some embodiments.

FIG. 1 shows the optical delay lines $14_1.1, 14_1.2, \ldots, 14_1.j, \ldots, 14_1.r$ associated with the first module $12_1$.

Similarly, the delay lines $14_n.1, 14_n.2, \ldots, 14_n.j, \ldots, 14_n.r$ are associated with the last module $12_n$.

The switch C further comprises means for reading the header of each optical packet and for identifying the corresponding routing. This identification, applied and interpreted by a control unit 40, is used to control the routing means 12 so that each optical packet received at an input E1 through En is directed to a chosen delay line 14 so that each packet is assigned a time-delay such that the packets can be reorganized in time to avoid routing conflicts.

To be even more precise, each routing module 12 preferably comprises a wavelength converter module 100 and wavelength-sensitive passive routing means 110.

Thus, in a preferred embodiment of the invention, the first stage 10 comprises N wavelength converter modules 100 respectively integrated in each of the N routing modules 12, each wavelength converter module 100 being adapted to transpose the wavelength of an optical packet received at one of the N inputs E1 through En to a wavelength chosen from $r$ available wavelengths. N groups of $r$ delay lines 14 respectively associated with each converter module 100 and each module 12 comprises respective wavelength-sensitive passive routing means 110 at the output of each converter module 100 to direct each packet from that module to one of the $r$ associated delay lines 14, according to its transposed wavelength.

Furthermore, in accordance with the invention, in each of the N groups, the $r$ delay lines 14 preferably define optical time-delays that differ from one line to another.

A preferred embodiment of wavelength converter modules 100 and the wavelength-sensitive passive routing means 110 integrated into each module 12 is described hereinafter with reference to FIG. 6.

The second stage 20 is a space switching stage. It is connected to the output of the delay lines 14 of the first stage 10 and adapted to direct the optical packets selectively to the output S1 through Sp corresponding to the routing determined by the header of each packet. The second stage 20 and the third stage 30 are connected by $r$ groups of P optical fibers 24. The second stage 20 therefore preferably comprises $r$ groups of P optical lines 24 associated with r routing modules $22_1, 22_2, \ldots, 22_i, \ldots, 22_r$.

Each routing module 22 has an input coupled to the output of N fibers 14, one from each of the N input modules 12. Each routing module 22 has P outputs respectively coupled to an input of one of P optical lines 24 each connected to a respective one of the outputs $S_1$ through $S_p$.

FIG. 1 shows the 24 optical lines $24_1.1, 24_1.2, \ldots, 24_1.i, \ldots, 24_1.p$ associated with the first routing module $22_1$. It also shows the optical lines $24_r.1, 24_r.2, \ldots, 24_r.i, \ldots, 24_r.p$ associated with the last routing module $22_r$.

To be even more precise, in a preferred embodiment of the invention the second stage 20 therefore comprises $r$ wavelength converter modules 200, the input of each of which is connected through a multiplexer 220 to the output of N delay lines 14 from a respective one of N inputs, each of the converter modules 200 being adapted to transpose the wavelength of an optical packet received from a delay line 14 to a selected one of P available wavelengths, $r$ groups of P optical lines 24 connected on the input side to respective converter modules 200 of the second stage and on the output side to one of P outputs of the switch, and $r$ respective wavelength-sensitive passive routing means 210 connected to the output of each converter module 200 of the second stage to direct each packet from this module to one of the P associated optical lines 24, according to its transposed wavelength.

The function of the third stage 30 is to couple the optical lines 24 to the outputs S, where necessary to define the time order of $m$ packets accessing the same output S after the second stage 20, $m$ representing the mean temporal depth per input or output, expressed in packet times, within which the switch must resolve routing conflicts. These $m$ packets can come from different inputs E. In this case they necessarily belong to different calls and their order is immaterial. If these packets come from the same input, the order in which they arrive must be preserved rather than modified.

Consequently, the matrices of the third stage 30, which would be indispensable for effecting all the N.m permutations, can be omitted in this case since the order in which the packets arrive at the last stage 30 can be retained at the switch output.

Accordingly, in accordance with the invention, the third stage 30 is preferably in the form of P passive multiplexers or couplers $32_1, 32_2, \ldots, 32_i, \ldots, 32_p$. Each coupler or multiplexer 32 has $\underline{r}$ inputs and one output. The $\underline{r}$ inputs of each coupler or multiplexer 32 are connected to respective outputs of optical lines 24 from $\underline{r}$ routing modules 22 of the second stage.

DETAILED DESCRIPTION OF THE SECOND PREFERRED EMBODIMENT (FIG. 2)

The embodiment shown in FIG. 2 will now be described.

This embodiment is intended in particular for large switches. It reduces the number of wavelengths required and in particular procures a more even balance between the first and second stages in this regard.

Figure 2:
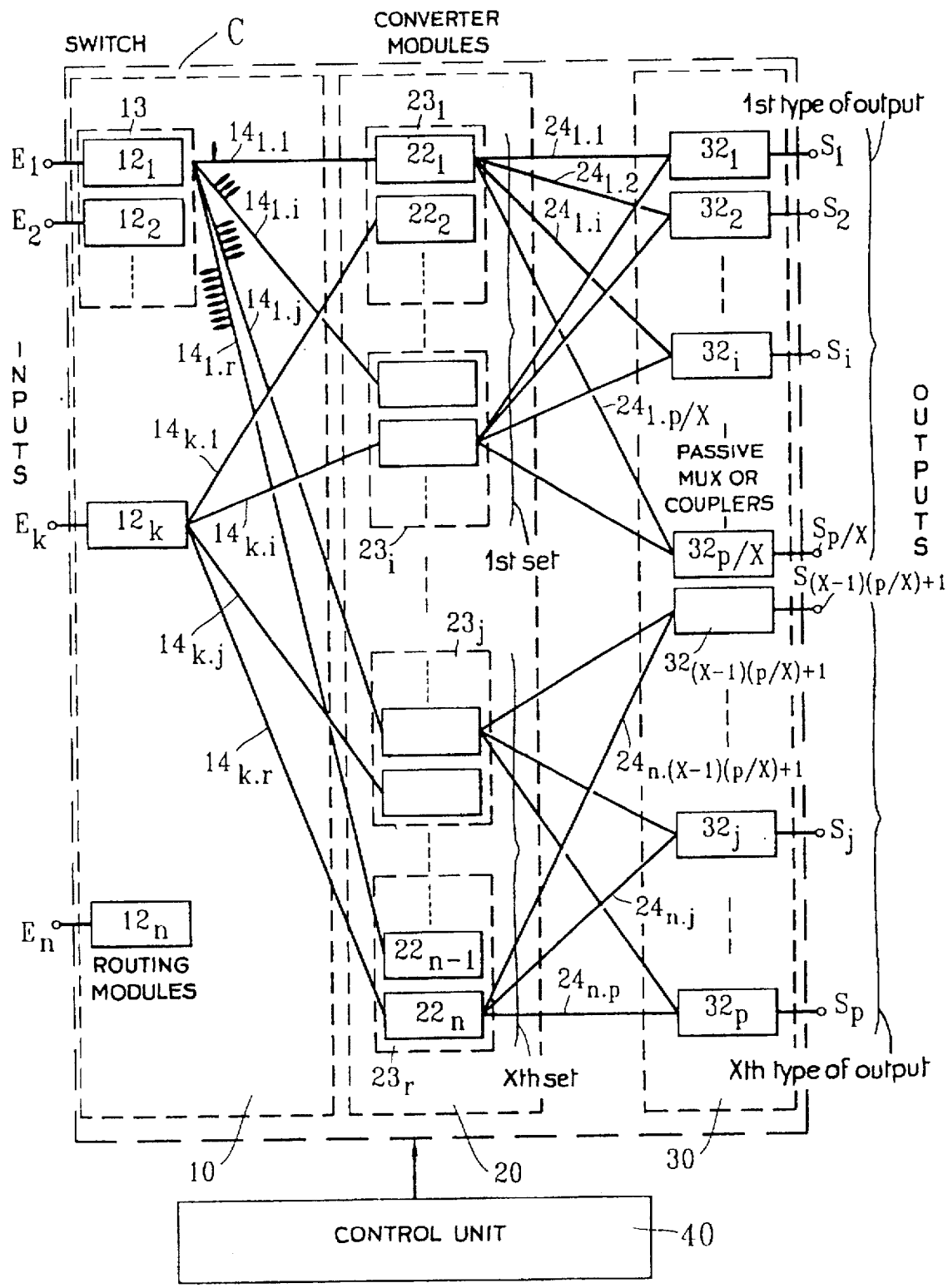
FIG. 2 is a block diagram of a different embodiment of optical switch of the present invention.

FIG. 2 shows an optical packet switch C having N inputs E1, E2, ..., Ek, ..., En and P outputs S1, S2, ..., Si, ..., Sp organized as a Clos network and including three stages 10, 20, 30 and a pseudo-random access memory.

Once again, P can be equal to N, but this is not mandatory.

In the FIG. 2 embodiment the first stage 10 is a time switching stage comprising N routing modules 12. These N routing modules 12 are organized into N/X blocks 13 each comprising X modules 12, in order to comply with the architecture of a Clos network. Each module 12 has $\underline{r}$ wavelengths to access $\underline{r}$ blocks of the second stage 20. The first stage 10 also comprises N groups of $\underline{r}$ delay lines 14. The N groups of $\underline{r}$ delay lines 14 are respectively associated with the N routing modules 12. Within each of these N groups, the $\underline{r}$ delay lines 14 are divided into X sets of r/X lines on average if r/X is not an integer, to enable the choice in the first stage 10 of one of X output sets and in each set of one of r/X on average delay lines 14. The N routing modules $12_1$ through $12_n$ have their input connected to a respective input E1 through En and are adapted to direct each optical packet received at an input E1 through En to a chosen one of the $\underline{r}$ delay lines 14 available at the output of each module 12.

In FIG. 2, which corresponds to the situation in which X=2, the delay lines $14_1.1$ through $14_1.i$ associated with the first module $12_1$ belong to a first set and the optical delay lines $14_1.j$ through $14_1.r$ associated with the same first module $12_1$ belong to a second set.

Similarly, the delay lines $14_k.1$ through $14_k.i$ associated with the module $12_k$ belong to the first set and the optical delay lines $14_k.j$ through $14_k.r$ associated with the same module $12_k$ belong to the second set.

The switch C in FIG. 2 comprises means for reading the header of each optical packet and for identifying the corresponding routing, applied and interpreted by control means 40 as explained for FIG. 1.

Each routing module 12 also preferably comprises a wavelength converter module 100 and wavelength-sensitive passive routing means 110.

Thus, in FIG. 2, the first stage 10 comprises N wavelength converter modules 100 respectively integrated into each of the N routing modules 12, each wavelength converter module 100 being adapted to transpose the wavelength of an optical packet received at one of the N inputs E1 through En to a selected one of $\underline{r}$ available wavelengths, N groups of $\underline{r}$ delay lines 14 respectively associated with each converter module 100 and each divided into X sets of r/X on average lines 14, and each module 12 comprises respective wavelength-sensitive passive routing means 110 at the output of each converter module 100 to direct each packet from this module to one of the $\underline{r}$ associated delay lines 14, according to its transposed wavelength.

The second stage 20 is a space switching stage. It includes N converter modules 22 divided into $\underline{r}$ blocks 23 each comprising Y=N/r converter modules 22, where $\underline{r}$ is greater than or equal to 2.m.X−1 where $\underline{m}$ is the parameter associated with the time window used. Each of the modules 22 has P/X wavelengths for a choice of output and is preceded by $\underline{r}$ delay lines 14.

The second stage 20 is coupled to the outputs of the delay lines 14 from the first stage 10 and adapted to direct the optical packets selectively to the output S1 through Sp corresponding to the routing determined by the header of each packet.

Each input E has a single port to any block 23.

X may be equal to Y but this condition is not mandatory.

The second stage 20 and the third stage 30 are connected by N groups of P/X optical fibers 24. Thus the second stage 20 preferably comprises N groups of P/X optical lines 24 associated with N routing modules $22_1, 22_2, \ldots, 22_i, \ldots, 22_n$.

Each routing module 22 has an input coupled to the output of $\underline{r}$ fibers 14 from $\underline{r}$ modules 12, respectively. Each routing module 22 has P/X outputs respectively coupled to one input of one of P/X optical lines 24 leading to an output S.

FIG. 2 shows the optical lines $24_1.1, 24_1.2, \ldots, 24_1.i, \ldots, 24_1.p/X$ associated with the first routing module $22_1$ and the optical lines $24_n.(X-1)(p/X)+1, 24_n.j, \ldots, 24_n.p$ associated with the last routing module $22_n$.

To be more precise, in the second stage 20, the N modules 22 are divided into X sets respectively associated with said X sets of lines 14 from the first stage 10 and in each of these X sets the N/X modules 22 are respectively connected to P/X outputs S by the lines 24.

The sets of N/X modules 22 of the second stage 20 do not necessarily correspond to an integer number of blocks 23.

The N/X first modules 22 are assigned to a first type of output, the next N/X modules 22 to a second type of output, and so on for X types of output. In this way each input E has ports to modules 22 associated with all types of output S.

For example, with X=Y=2, the first half of the routing modules 22 of the second stage 20 can be connected to the first half of the outputs S (or alternatively to the even-numbered outputs S) and the other half of the routing modules 22 to She second half of the outputs S (or the odd-numbered outputs S). This arrangement, applicable in particular to large switches, reduces the number of wavelengths needed.

To be even more precise, in a preferred embodiment of the invention as shown in FIG. 2, the second stage 20 thus comprises $\underline{r}$ blocks 23 of Y wavelength converter modules 200 each connected on the input side via a multiplexer 220 to the output of $\underline{r}$ delay lines 14 from $\underline{r}$ inputs, respectively, each of the converter modules 200 being adapted to transpose the wavelength of an optical packet received in this way from a delay line 14 to a chosen one of P/X available wavelengths, Y.r=N groups of P/X optical lines 24 respectively associated on the input side with each converter module 200 of the second stage and on She output side with one of P/X outputs of the switch, and Y.r=N respective wavelength-sensitive passive routing means 210 at the output of each converter module 200 of the second stage to direct each packet from this module to one of the associated P/X optical lines 24 according to its transposed wavelength.

By setting Y=X=1 this embodiment becomes equivalent to that of FIG. 1: each converter module 200 is adapted to transpose the wavelength of an optical packet received from a delay line 14 to a chosen one of P available wavelengths and there are N groups of P optical lines 24 respectively associated on the input side with each converter module 200 of the second stage and on the output side with one of the P outputs of the switch, the N wavelength-sensitive passive routing means 210 being respectively placed at the output of each converter module 200 of the second stage to direct each packet from this module to one of the P associated optical lines 24 according to its transposed wavelength.

In a comparable manner to FIG. 1, the function of the third stage 30 is to couple the optical lines 24 to the outputs S, where applicable to define the time order of the $\underline{m}$ packets accessing the same output S after the second stage 20.

The third stage 30 of FIG. 2 can be formed by P passive multiplexers or couplers $32_1, 32_2, \ldots, 32_i, \ldots, 32_p$. Each coupler or multiplexer 32 has N/X inputs and one output. The N/X inputs of each coupler or multiplexer 32 are connected to respective outputs of optical lines 24 from N/X routing modules 22 of the second stage. In accordance with the architecture of a Clos network, the P outputs S are grouped into P/X blocks of X modules 32 corresponding to X different types of output.

As previously mentioned, and as shown in FIG. 2, the connections between the various modules of the three stages 10, 20 and 30 via delay lines 14 and optical lines 24 enable a signal arriving on any input E to access any output S.

This is due in particular to the fact that each input module 12 has a choice of X sets of outputs, i.e. X sets of delay lines 14, which X sets of outputs or delay lines can respectively lead through modules 22 of the second stage, the lines 24 and the output modules 32, respectively, to X different groups of P/X outputs S.

Accordingly, if the N/X first modules 22 of the second stage 20 are connected to the P/X first modules 32 of the third stage 30 and the N/X last modules 22 of the second stage 20 are connected to the P/X last modules 32 of the third stage 30, the same input module 12 is simultaneously connected to the N/X first modules 22 and to the N/X last modules 22 of the second stage 20.

To even up the number of wavelengths for the first stage 10 and for the second stage 20, $\underline{r}$ is made equal to N/X. Since r>2.m, X is necessarily an integer and $X<(N/2.m)^{1/2}$.

For switches with N inputs and P outputs the number r/X of delay lines accessible in each of the X sets at the output of each of the input modules 12 continues to be determined by the parameter $\underline{m}$ of a switch having N inputs and N outputs.

DETERMINATION OF TIME-DELAYS

As previously mentioned, each input E1 through En is associated with a chosen one of X sets of outputs 14 and for each set there is a choice of r/X on average available time-delays by virtue of the N groups of $\underline{r}$ delay lines 14.

Each of these choices must correspond to an integer number of "packet times", because the switch operates synchronously. Thus each optical fiber constituting a delay line 14 defines a time-delay equal to an integer number of packet times.

Additionally, the set of delay lines 14 of the switch contains the P queues corresponding to the P outputs S1 through Sp. The maximal length of one of these queues with an average load per input of 0.8 defines the maximal time-delay that a packet can be subjected to and thus the maximal length of the delay lines. This value corresponds to the size of the memories associated with each output S1 through Sp of the switches resolving output address conflicts.

For three switches having a number N of inputs/outputs respectively equal to 16, 32 and 64, the size L of this memory must be at least equal to 41, 43 and 44, respectively.

Consequently, each input E has a choice of X sets of outputs 14 and in each of these sets a choice of r/X on average time-delays between 1 and approximately L "packet times", by virtue of X sets of r/X on average delay lines 14 available at the output of each routing module 12 and defining time-delays staggered between one and about L "packet times".

SIZE OF A QUEUE PER OUTPUT OF AN N×N SWITCH

This parameter gives the maximal length in packets of the queue that may be required for any output if a given rate loss is to be guaranteed for a given uniform traffic load (see M. G. Hluchyj & M. J. Karol, "Queuing in High-Performance Packet Switching" in I.E.E.E. Journal on selected areas in communications, vol. 6, No 9, 1988).

Let L be the maximal size of the queue associated with an output of an N×N switch. Let $\underline{p}$ be the load per input (probability that a packet is present at any input).

The packet loss probability is given by:

$$P=1-[1-a_0 \cdot q_0]/p$$

where $$q_0 = 1/[1 + \Sigma_{(i=1,L)} q_i]$$

$$q_1 = [1-a_1]/a_0 - 1$$

$$q_i = [(1-a_1) \cdot q_{i-1}]/[a_0 \cdot q_0] - \Sigma_{(k=2, Min(i,N))} a_k \cdot q_{i-k}/a_0 \ i=2,L$$

$$a_k = C_N^k \cdot (p/N)^k \cdot (1-p/N)^{N-k} \ k=0,N$$

For the switch never to remain inactive, all the delay lines 14 must cover all "packet times" between 1 and L.

Finally, each converter module 22 of the second stage 20 receives the packets from $\underline{r}$ delay lines 14.

Sequential processing of the packets requires prohibition of the association of delay lines 14 of the same length with the same converter 22. For this reason the $\underline{r}$ delay lines 14 from the first stage 10 coupled to the same module 22 of the second stage define different optical time-delays.

Figure 3:
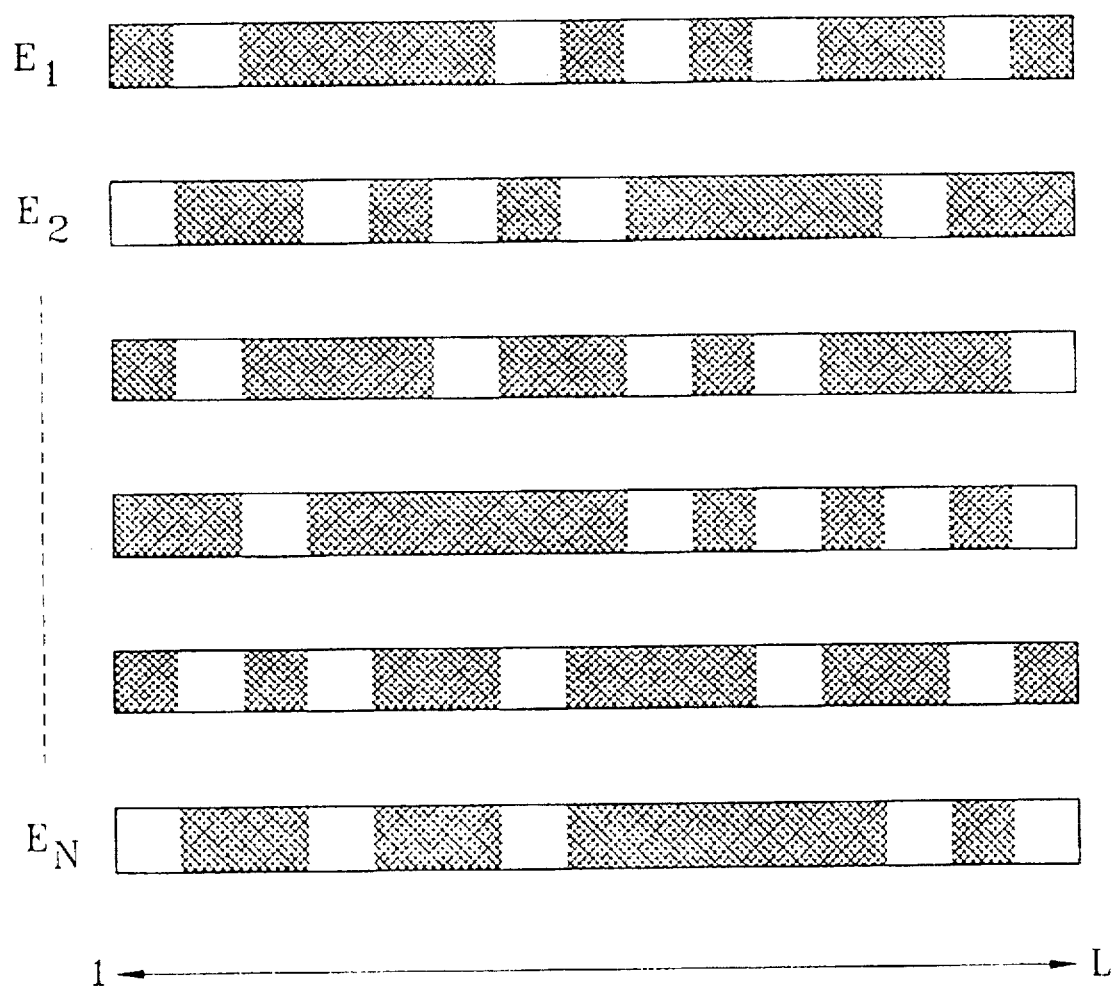
FIG. 3 is a diagram showing the wavelengths of delay lines associated with the various inputs.

To be even more precise, the $\underline{r}$ delay lines 14 from $\underline{r}$ inputs are successively assigned to each converter 22 of the second stage, for example by circular permutation of step Y. A permutation of this kind is shown diagrammatically in FIG. 3. In this figure, the abscissa axis represents the lengths of the delay lines 14 associated with the various inputs, plotted on the ordinate axis. In FIG. 3, each white square defines one of $\underline{r}$ wavelengths accessible to a packet from the input on the ordinate axis.

For X=1 the circular permutation can be defined as follows: the first converter module $22_1$ is preceded by the shortest delay line $14_1.1$ of input E1 to the longest delay line $14_n.1$ of input $\underline{n}$ the second converter $22_2$ of the second stage receives the longest delay line $14_1.2$ of input E1, the shortest delay line of input E2 up to the second shortest delay line $14_n.2$ of input En, and so on up to the last converter module $22_r$.

For X>1 any input $E_k$ is assigned the shortest delay line 14 preceding the module $22_k$ of the second stage, then the second shortest delay line of the module $22_{k+Y}$ of the second stage, and so on in steps of Y modules 22 for each increment on the length of the delay line 14.

In the first stage 10, the choice of the dimension $\underline{r}$ breaks down into a choice of X groups of outputs and a choice of r/X (on average) time-delays. In the second stage 20, the first N/X modules 22 correspond to the group 1 of P/X outputs, the next N/X modules 22 to the group 2 of P/X outputs, and so on. The type of output addressed by the module $i$ of the second stage is:

$$x_i = E((i-1) \cdot X/N) + 1 \ (x_i = 1, X)$$

where "E" represents the integer part.

The outputs it can access are given by:

$$s_i = x_i + (q-1) \cdot X \ (q=1, P/X)$$

considering interdigitated types of output, for example two types of output alternately even and odd, or $$s_i = (x_i - 1)(P/X) + q \ (q=1, P/X)$$

if each type of output corresponds to a continuous series of outputs, not interdigitated from one type of output to the other.

It is preceded by $r$ delay lines 14 associated with the inputs:

$$k = [i - p \cdot Y1]_N + 1 \ (p=0, r-1).$$

Conversely, the input $E_k$ addresses the modules $i$ of the second stage via the delay lines:

$$i = [k + p \cdot Y - 1]_N + 1 \ (p=0, r-1).$$

The length of the delay lines increases with $p$ and corresponds to an integer number of packets between 1 and L.

In the above two equations, the notation $[\ ]_N$ means "Modulo N".

Apart from these constraints, the choice of delay lines must be random so that there is no bias in the choice. In this sense, the set of delay lines 14 of the switch defines a pseudo-random access memory.

The unit 40 controlling the converter modules 12 and 22 to resolve addressing conflicts can be implemented in various ways and therefore will not be described here.

To solve addressing conflicts the control unit 40 must take into account the conflicts arising when a plurality of packets require the same output simultaneously and the conflicts arising when a packet requires an output for which there is already a queue of packets that were previously involved in a conflict situation. Accordingly, the control unit 40 must control the routing means 12 and 22 associated with the delay lines 14 to rearrange the packets in time with respect to the time order in which they access the switch for any input port so that they access the required output sequentially The mean time depth $m$ to which this rearrangement must be effected is defined by the permissible packet loss rate. A nil loss rate would correspond to time rearrangement applying to an unlimited number of "packet times", since with uniform and static traffic there is a non-null probability of the event whereby all of the packets accessing the switch would constantly require the same output: the increase in the number of packets affected is then n-1 per "packet time"

The size of the memory of a switch of this kind needed to manage the packets to a mean time depth $m$ for all the inputs has been evaluated for a shared memory switch subject to the approximation that the overall queue is the sum of the queues per independent output. Considering the queues per output assumes that the switch is able to route the packets to their output despite addressing conflicts, the problem then reducing to implementing queues for each output. This management of addressing conflict is optimal in terms of queues, since the switch effects its space switching function with maximal efficiency, independently of the time reorganizations made necessary by the sequential flow of packets to each output. On the other hand, considering that the queues per output are independent is an approximation. If a packet requires an output, it does not require to access another output: this information is ignored in the independent queue approach. The efficacy of the approximation used is directly proportional to the size of the switch and the consequent overdimensioning of the parameter $m$ remains below 15% for N greater than 16, as is made clear in the previously mentioned document by Eckberg et al.

For example, for three sizes of switch where the number N of inputs/outputs is respectively equal to 16, 32 and 64, the parameter $m$ defining the mean time depth per input or output to which packets must be permutated in time is respectively equal to 8, 6 and 5 for a loss rate of $10^{-9}$ and a load of 0.8.

MEMORY DIMENSION OF AN N×N SHARED MEMORY SWITCH

The memory of a shared memory switch contains all of the queues associated with the various outputs of a switch. Consequently, the number of packets queued is equal to the sum of the queues for each output. Let M be the size of this memory.

Let Yi be the number of packets queued for output $i$. Let A be the total number of packets queued in the switch:

$$\text{Probability } [A=a] = \text{Probability } [\Sigma_{(i=1,N)} Y_i = a].$$

In the approximation whereby the queues at the various outputs are independent, the random variables Yi are independent. Given this approximation, the probability law of any variable Yi is given by:

$$\text{Probability } [Y_i = n] = q_n \cdot q_0 \ n \geq 1, M$$

$$\text{Probability } [Y_i = 0] = q_0$$

In the above expressions, $q_0$ and $q_n$ are obtained using the formulas given above in the description of the dimension of a queue per output for an N×N switch, substituting M for L. The loss probability is:

$$\text{Probability } [X = \Sigma_{(i=1,N)} Y_i > M]$$

The approximations used are valid provided that N is greater than 16 (see Eckberg et al. INFOCOM'88, 459 (1988)). The parameter $m$ used to dimension the Clos network for a switch of given size N and for a given loss probability is given by:

$$m \geq 1 + M/N, \text{ where } m \text{ is an integer.}$$

Each matrix of the switch in accordance with the invention represents a non-blocking switching network. For the Clos network itself to be non-blocking, the parameter $r$ which is equal to the number of blocks and modules of the second stage 20 must be greater than or equal to 2.m.X−1.

In each input module 12 the label of each optical packet is analyzed after opto-electronic conversion. The control unit 40 of the switch C determines the time-delays assigned to each packet according to the outputs requested and the status of the queues in order to minimize the time-delay to which each packet is subjected, knowing that each converter and each output can receive only one packet per "packet time", and preserving the order of arrival of the packets for each input/output pair.

Thus part of the input signal is sampled to read the label at each input module 12. The remaining signal accesses the first conversion stage contained in the module 12, where the label can be deleted if necessary. In this case a new label is written in the second conversion stage 20.

FIRST EMBODIMENT FOR A 16×16 SWITCH

For a switch with 16 inputs and 16 outputs, m=8 and consequently r must be greater than 15.

For example, r can be made equal to 16 to use 16 wavelengths in the first stage 10 and in the second stage 20. The switch C therefore includes 32 converter modules, namely 16 modules in the first stage 10 and 16 modules in the second stage 20, each module operating at 16 wavelengths.

To be more precise, in this specific and non-limiting embodiment of the present invention, the first stage 10 comprises N=16 wavelength converter modules 100 each adapted to transpose the wavelength of an optical packet received at one of the N=16 inputs E to a wavelength chosen from r=16 available wavelengths, N=16 groups of r=16 delay lines 14 respectively associated with each converter module 100 and n=16 respective wavelength-sensitive passive routing means 110 at the output of each converter module 100 to direct each packet from this module to one of r=16 associated delay lines 14, according to its transposed wavelength, the second stage 20 comprises one set of r=16 wavelength converter modules 200 each coupled on the input side via a 16-to-1 multiplex 220 to the output of N=16 delay lines 14 from N=16 respective inputs, each of the r=16 converter modules 200 of the second stage 20 being adapted to transpose the wavelength of an optical packet received from a delay line 14 to a chosen one of P=16 available wavelengths, r=16 groups of P=16 optical lines 24 respectively associated on the input side with each converter module 200 of the second stage 20 and on the output side with P=16 outputs S of the switch and r=16 respective wavelength-sensitive passive routing means 210 at the output of each converter module 200 of the second stage 20 to direct each packet from the module 200 to one of the P=16 associated optical lines 24, according to its transposed wavelength, and the third stage 30 comprises P=16 passive multiplexers or couplers 32 with r=16 inputs and one output.

Figure 4:
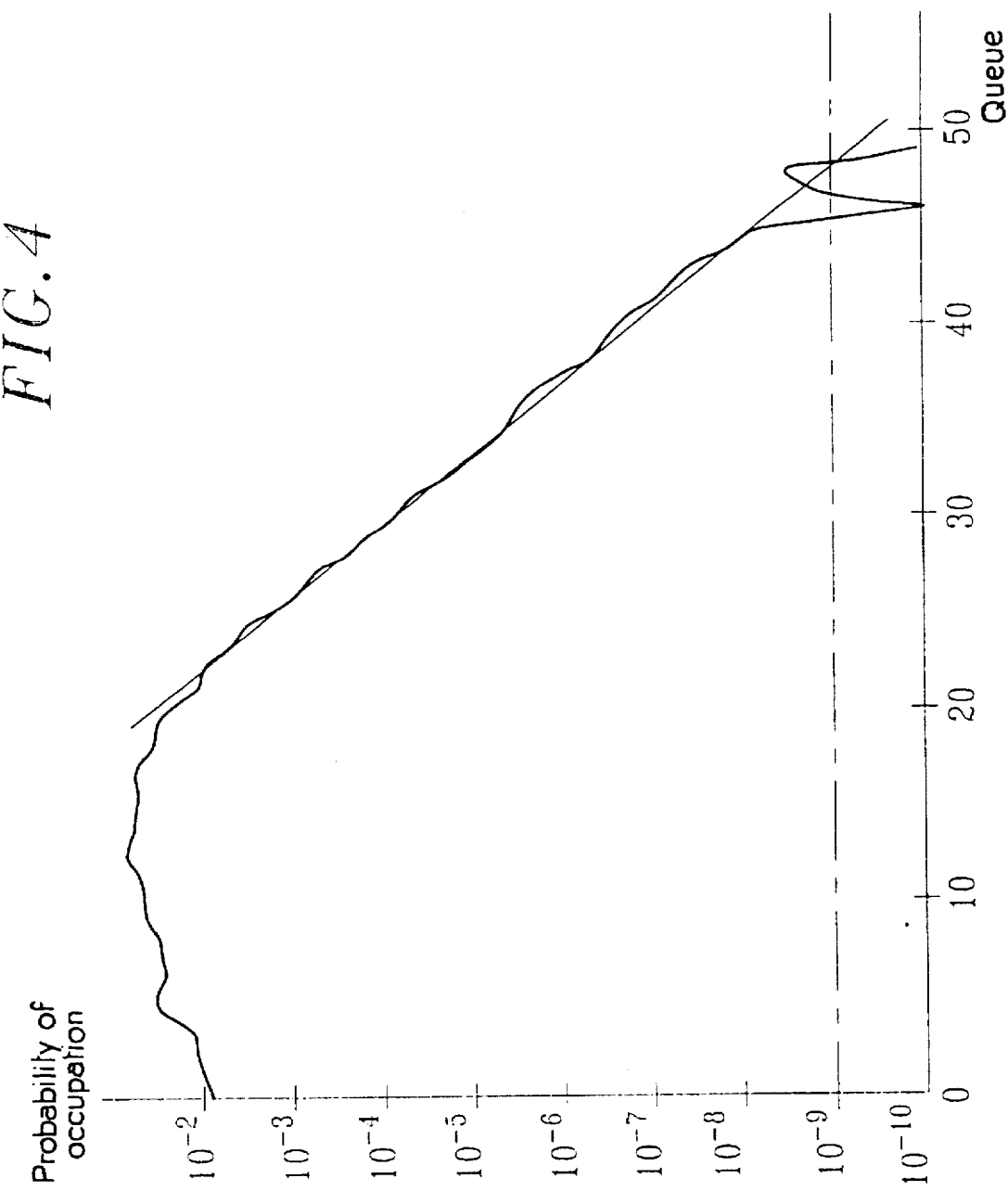
FIGS. 4 and 5 show, for two switches in accordance with the present invention, the probability of occupation of delay lines as a function of the length of the queues.

The inventors have simulated successive packets arriving over $10^7$ "packet times" For each input, a first random sort determines the presence or the absence of a packet so that on average a packet is present eight times in ten. If a packet is present at the input in question, a second random sort determines the output requires with an equal probability distribution of all the outputs. These sorts are not correlated with each other or with the various "packet times". A Markov process is simulated: the state of the switch at a given time depends only on its state at the previous time via a transition matrix. Under steady-state conditions, the behaviour of the switch is determined by the smallest value of the transition matrix. FIG. 4 shows the probability of the presence of queued packets in the switch as a function of the waiting time. Each input has 16 ports to the delay lines 14. The successive lengths of the delay lines are incremented on average by three "packet times" so that the maximal average length is 48 "packet times".

The exponential nature of the occupancy probability is seen clearly in FIG. 4. Using a logarithmic scale, the straight line characteristic of this behavior reaches a probability of $10^{-9}$ for a delay of 48 "packet times" indicating that the adopted criteria (packet loss rate less than $10^{-9}$ for uniform traffic and a load of 0.8 per input) are satisfied.

SECOND EMBODIMENT FOR A 64×64 SWITCH

The parameter m is determined by the size of the memory of a shared memory switch. This memory contains the P queues associated with the P outputs. The length of each of these queues corresponds to a random number characterized by its variance. As the variance of the sum of these queues determines the size of the memory and increases sublinearly with the number of queues because of the statistical multiplexing, the parameter m decreases with the size of the switch.

For N=P=64 and for X=1, the value of m is 5 and the parameter r must be greater than or equal to 9.

If the FIG. 1 architecture adopted for the 16×16 switch were used again, the converter modules 12 of the first stage 10 would operate at nine wavelengths and the switches of the second stage 20 for routing the packets to the required outputs S would operate with 64 wavelengths.

To even up the two stages 10 and 20 and to reduce the number of wavelengths needed, the switch can be organized as shown in FIG. 2, with the routing modules 22 of the second stage 20 in the form of sets associated with respective chosen outputs S.

For example, the routing modules 22 of the second stage 20 can be divided into two sets of which one is connected to the even outputs S and the other to the odd outputs S, or one to the first half of the outputs S and the other to the second half of the outputs S.

To be more precise, in this particular and non-limiting embodiment of the invention, the first stage 10 comprises N=64 wavelength converter modules 100 each adapted to transpose the wavelength of an optical packet received at one of N=64 inputs E to a chosen one of r=32 available wavelengths, N=64 groups of r=32 delay lines 14 respectively associated with each converter module 100 and N=64 respective wavelength-sensitive passive routing means 110 at the output of each converter module 100 to direct each packet from this module to one of r=32 associated delay lines 14 according to its transposed wavelength, the second stage 20 comprises r=32 blocks of Y=2 wavelength converter modules 200 each coupled on the input side via a multiplexer 220 to the output of r=32 delay lines 14 from 32 respective inputs, each of the r.Y=N=64 converter modules 200 of the second stage 20 being adapted to transpose the wavelength of an optical packet received from a delay line 14 to a chosen one of P/X=32 available wavelengths, r.Y=64 groups of P/X=32 optical lines 24 respectively associated on the input side with each converter module 200 of the second stage 20 and on the output side with P/X=32 outputs S of the switch, respectively even or odd, and r.Y=64 respective wavelength-sensitive passive routing means 210 at the output of each converter module 200 of the second stage 20 for directing each packet from this module to one of P/X=32 associated optical lines 24 according to its transposed wavelength and the third stage 30 comprises P=64 passive multiplexers or couplers 32 with N/X=32 inputs and one output.

In the first conversion stage 10 each input is routed to a given set of modules 22 of the second stage 20 by the control means 40 according to the required even or odd output and, for each of these two eventualities, is directed to one of the r/X=16 possible delay lines 14.

In the second conversion stage 20 the packet can access one of the 32 even or odd outputs according to the choice made in the first conversion stage.

The frequency capacity of the first stage 10 has thus been doubled, so that the second stage 20 can be divided by two to optimize the use of wavelengths. The operating principle of this switch is strictly identical to that previously explained.

Figure 5:
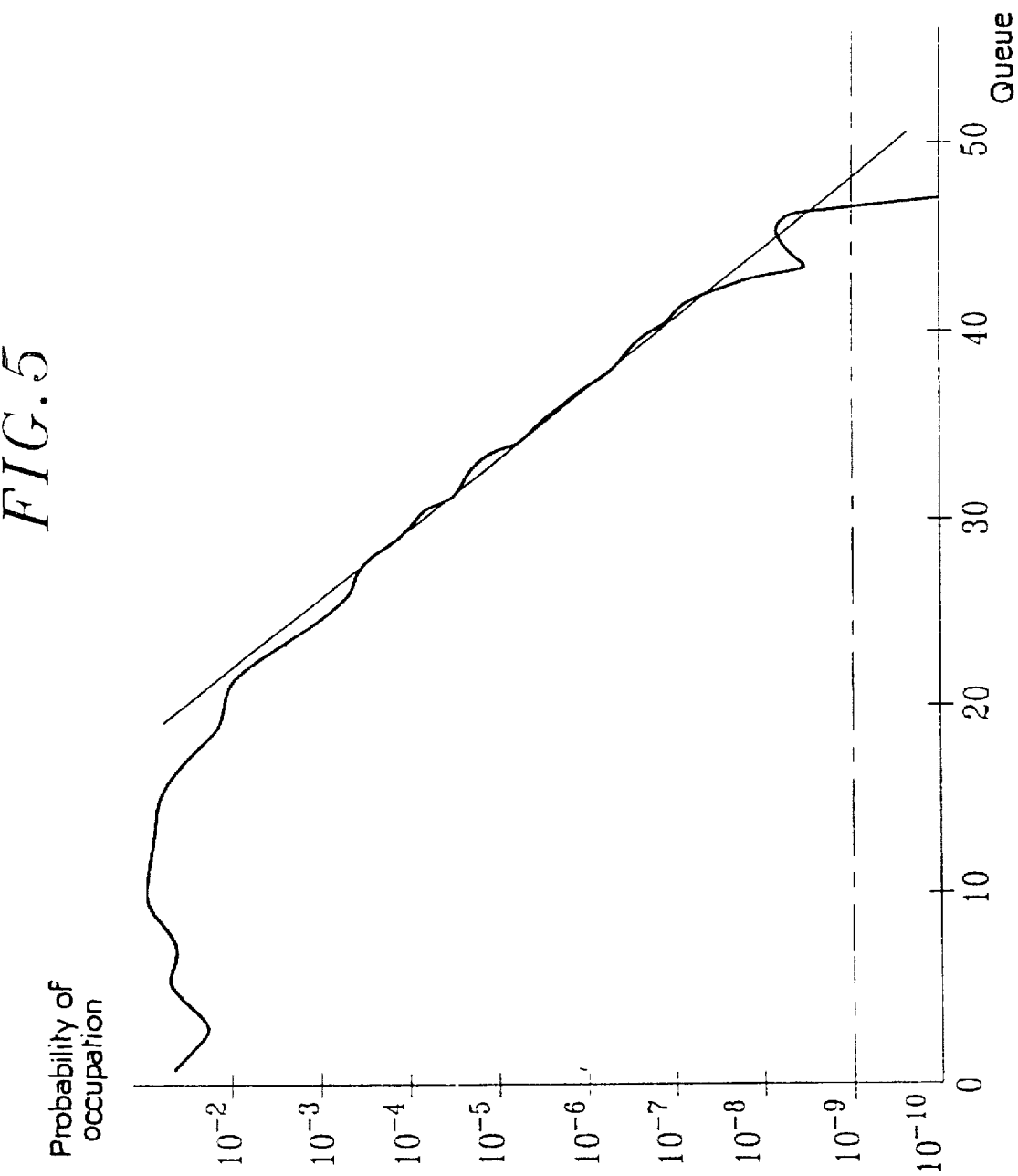

FIG. 5 shows that the probability of having a packet queued with a time-delay greater than the maximal size of the delay lines (48 "packet times") is less than $10^{-9}$.

This probability is again obtained by extrapolating the exponential nature of the probability of having a packet queued with a given time-delay, conforming to the Markov nature of the process.

In conclusion, the present invention proposes an optical packet switch architecture solving addressing conflicts for a packet loss rate less than $10^{-9}$ for a mean probability of presence of packets per input port less than 0.8 and for uniform traffic.

A pseudo-random access memory is based on fiber optic delay lines 14. The memory ports to the delay line 14 controlled in the first stage 10 and the ports to the output ports S controlled by the second stage 20 are based on conversion of the wavelengths of the optical packets.

In the switch of the invention only the header detected in the first stage 10 is subjected to opto-electronic conversion to determine the required output port of the packet.

The payload remains in optical form and is never processed in any form whatsoever at information bit level. It is therefore routed directly by the switching network to its output port on the basis of the information contained in the header. In this way the bandwidth of the payload is not limited by the electronic technology, but only by the technology of the optical components. In this sense the switch of the invention is totally transparent to the payload.

The payload of any packet is therefore processed only by two active optical components made up of frequency conversion stages and fiber optic delay lines. The switch has only two processing stages and its architecture is relatively simple. The deterioration of the signal to noise ratio inherent to any component is reduced to that contributed by the two converter modules and the two multiplexers, one preceding the second stage and the other preceding the output.

The routing modules 12 and 22 can be implemented in various ways.

Figure 6:
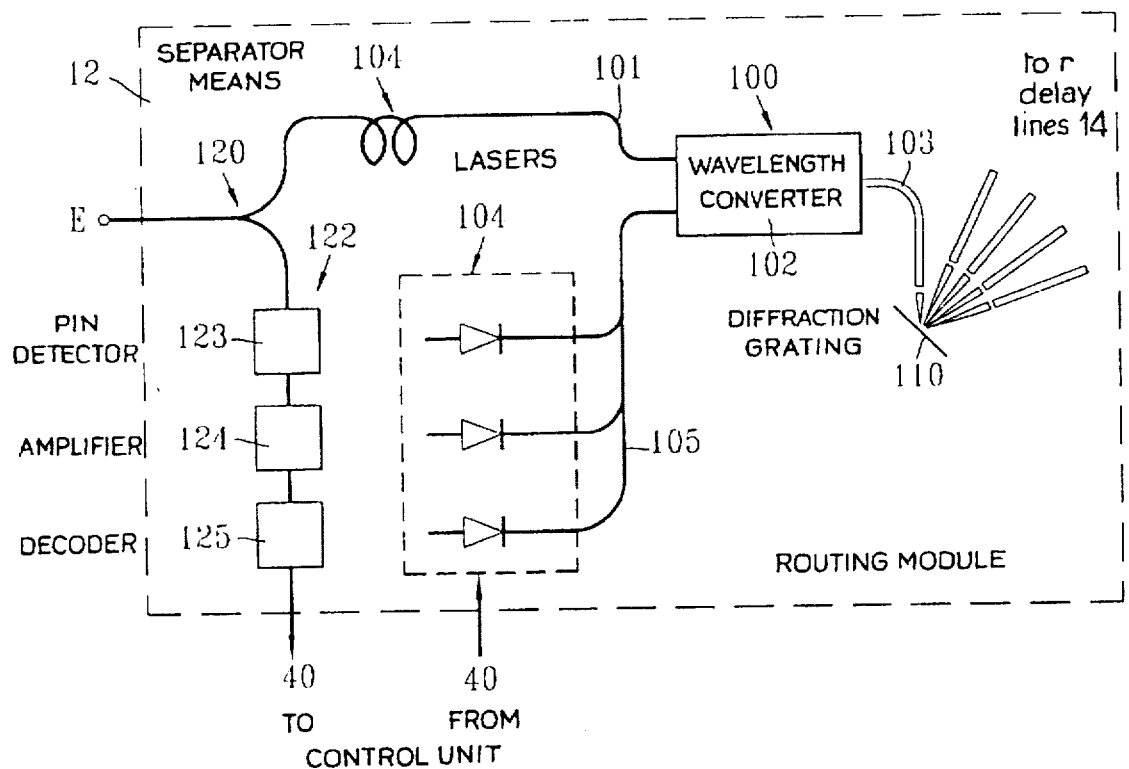
FIG. 6 is a diagram showing one implementation of a wavelength converter and passive routing means module in accordance with the present invention that can be used in the time switching first stage in particular.
Figure 7:
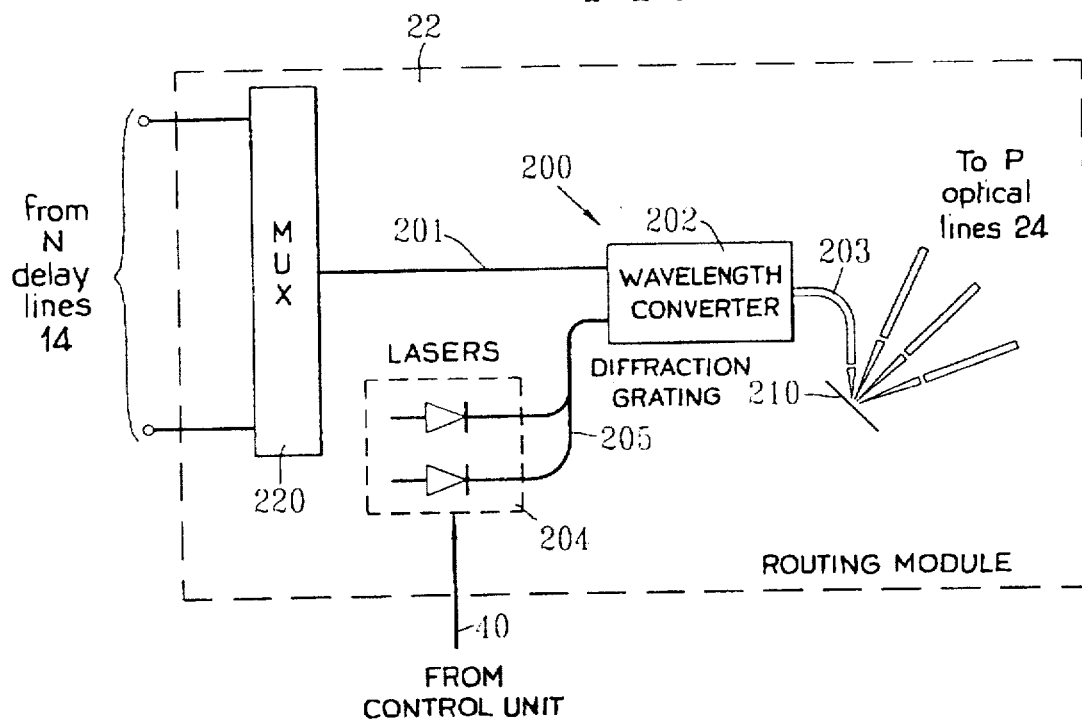
FIG. 7 shows an alternative embodiment of a wavelength converter module associated with passive routing means that can be used in the space switching second stage in particular.
Figure 8:
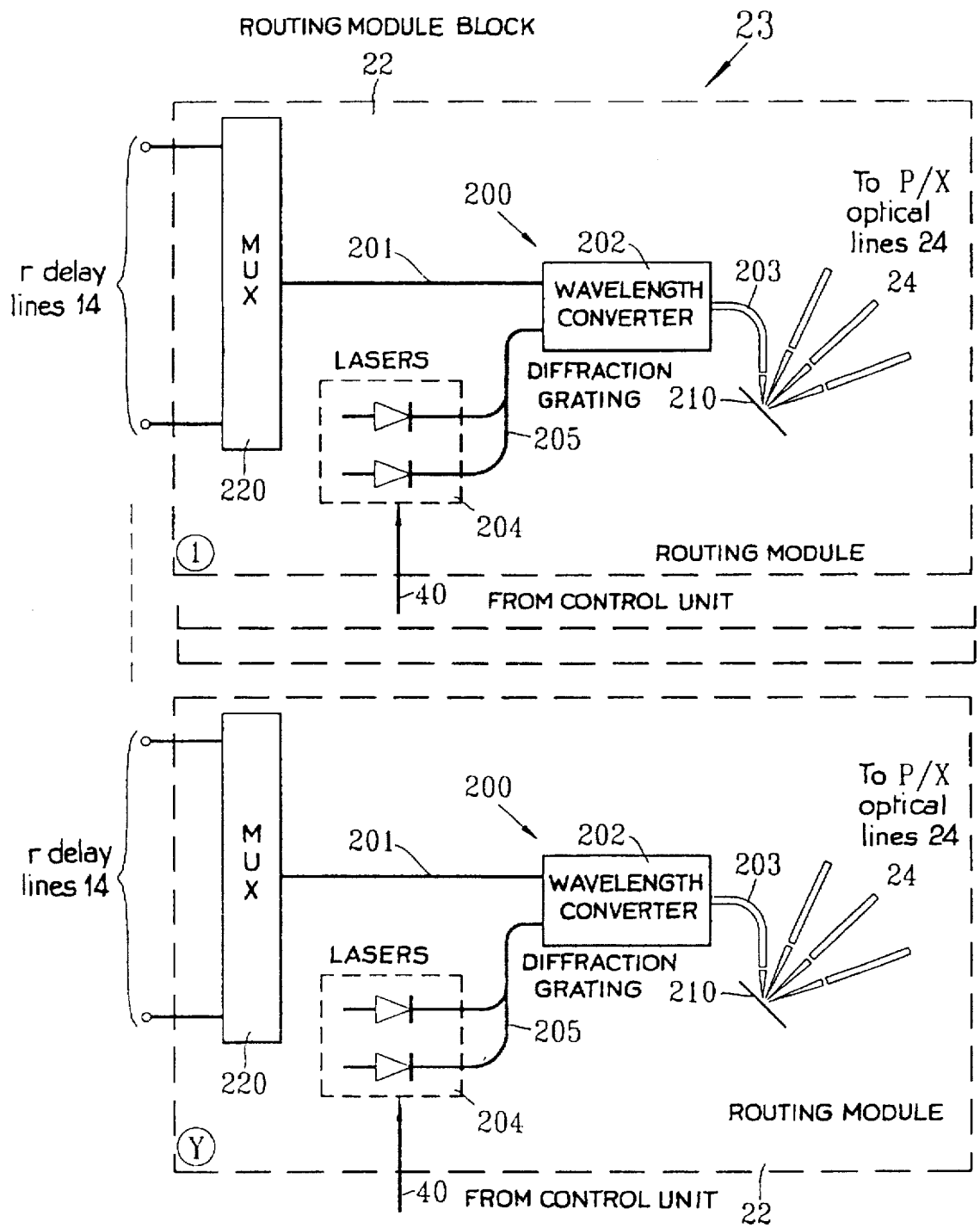
FIG. 8 shows a second embodiment of a wavelength converter module associated with passive routing means that can be used in the space switching second stage.

The routing means 12, 22 of the type shown in FIG. 6 and respectively in FIGS. 7 and 8 are preferably as described and shown in French patent application No 93 10800 filed 10 Sep. 1993, the contents of which are hereby incorporated by way of reference.

Essentially, these routing means comprise wavelength conversion means 100, 200 and passive routing means 110, 210 preceded, in the first stage 10 at least, by separator means 120.

The structure of the routing means 12 for the first stage 10 will now be described with reference to FIG. 6.

The separator means 120 are designed to separate the optical signals received at the input into two groups: one group containing at least the routing address and one group containing at least the payload. In practise the two groups obtained at the output of the separator means 120 can be identical and each comprise the routing address and the payload. The payload can be used in the channel processing the routing address to synchronize the phase of the label relative to the payload when rewriting the label, for example.

If necessary, the separator means 120 can be designed to pass on the address signal with or without modification of the payload.

The separator means 120 can be in the form of any appropriate means known to the person skilled in the art. By way of non-limiting example, the separator means 120 can be in the form of a conventional fiber optic coupler.

The separator means 120 are associated with means 122 adapted to detect the routing information electronically and to translate it into an address.

These address detecting and processing means 122 can comprise a conventional PIN optical detector 123 followed by an amplifier 124 and a digital address decoder circuit 125 controlling the wavelength converter means 100, for example.

The digital decoder and control circuit 125 must be matched to the addressing code, the number of bits in the address and the telecommunication network.

The means 122 can be integrated into each module 12, being connected to the control circuit 40, or integrated into the control circuit 40 itself.

The control circuit 40 controls the wavelength converter means 100 according to the required routing.

The wavelength converter means 100 can also be in any appropriate form known to the person skilled in the art.

In the context of the present invention, the converter means 100 are preferably formed by the combination of a semiconductor optical amplifier 102 and a set of $r$ lasers 104 controlled by the control means 40. The number $r$ of lasers 104 used is equal to the number $r$ of wavelengths required.

For the module of the first stage 10 the payload is applied to the input of the optical amplifier 102 via an optical fiber 101 between the output of the separator means 120 and said input of the amplifier 102. The outputs of the lasers 104 are connected by respective fibers 105 to an auxiliary input of the same optical amplifier 102 or coupled to the optical fiber 101 before the input of the optical amplifier 102. The function of the optical amplifier 102 is to transpose onto the output wavelength of the activated laser 104 the information from the optical fiber 101.

Thus, depending on the content of the address identified at the output of the means 122, which address determines the routing of the message, the control means 40 activate one of the $r$ lasers 104 of particular wavelength to which the wanted message will be transferred and that will be used to route the wanted message to the associated output.

The wavelength of the signal from the converter means 102 consequently corresponds to the wavelength of the activated laser 104 and therefore varies according to content of the address detected by the means 122.

The optical amplifier 102 can be of any form known to the person skilled in the art, for example as described in Electronics Letters, 27 Aug. 1992, vol. 28, No. 12, page 1714.

The output 103 of the optical amplifier 102 is connected to the passive routing means 110 which are preferably in the form of a diffraction grating. The diffraction grating 110 operating as a demultiplexer therefore directs the optical signal to one of the $r$ available output channels, according to the value of the wavelength of the signal that it receives at its input.

As can be seen in FIG. 6, the optical fiber 101 which directs the wanted message from the output of the separator means 120 to the optical amplifier 102 can include a time-delay element, formed by various turns, for example, to allow for the time of electronic processing of the address signal in the means 122. These turns 104 defining a time-delay in the wanted message are shown in FIG. 6.

The diffraction grating 110 integrated into the modules 12 of each first stage 10 therefore directs the optical packets to a chosen one of the $r$ available delay lines 14.

One embodiment of the routing means 22 of the second stage 20 will now be described with reference to FIG. 7. The routing means 22 of FIG. 7 are preferably intended for a switch of the type shown in FIG. 1 (i.e. where X=1).

FIG. 7 includes wavelength converter means 200 and passive routing means 210 as previously described with reference to FIG. 6. To be more precise, in FIG. 7, wavelength converter means 200 are provided in each module 22 of the second stage 20 in the form of an optical amplifier 202 coupled on the input side by a fiber 201 and via a multiplexer 220 with N=r inputs and one output to the outputs of the N=r associated delay lines 14 and controlled by a group of P lasers 204 themselves controlled by the means 40 according to the required routing. Also, each converter module 202 of the second stage 20 is coupled by an optical line 203 to a diffraction grating 210.

The operation of the means 202, 204 and 210 is identical to that of the similar means 102, 104 and 110.

Consequently, the diffraction grating 210 of each module 22 of the second stage 20 is adapted to direct the packets selectively to one of the P associated optical lines 24 corresponding to the chosen output.

FIG. 8 shows a different embodiment of the routing means 22 of the second stage 20 for a switch of the type shown in FIG. 2.

FIG. 8 shows wavelength converter means 200 and passive routing means 210 as previously described with reference to FIGS. 6 and 7. To be more precise, in FIG. 8, Y modules 22 are provided in each block 23 of the second stage 20, each comprising wavelength converter means 200 in the form of an optical amplifier 202 coupled on the input side by a fiber 201 and via a multiplexer 220 having r inputs and one output to the outputs of r associated delay lines 14 and controlled by a group of P/X lasers 204 themselves controlled by the unit 40 according to the required routing. Additionally, each converter module 202 of the second stage 20 is coupled by an optical line 203 to a diffraction grating 210.

The operation of the means 202, 204 and 210 is identical to that of the similar means 102, 104 and 110.

Consequently, the diffraction grating 210 of each module 22 of the second stage 20 is adapted to direct the packets selectively to one of the P/X associated optical lines 24 corresponding to the chosen output.

Of course, the present invention is not limited to the particular embodiments that have just been described, but encompasses any variant thereof within the spirit of the invention.

There is claimed:

1. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, where N, P, X and r are positive integer numbers a space switching second stage coupled to the output side of the delay lines of the first stage and adapted to direct the optical packets selectively to the output corresponding to the routing determined by the header of each packet, and an output third stage.

2. Switch according to claim 1 wherein the third stage is passive.

3. Switch according to claim 1 wherein the third stage is adapted to define the time order of the packets accessing the same output after the second stage.

4. Switch according to claim 1 wherein the first stage comprises N groups of r delay lines and N routing modules adapted to direct each received optical packet to a chosen one of r available delay lines.

5. Switch according to claim 1 wherein the second stage comprises r blocks each including Y=N/r routing modules.

6. Switch according to claim 1 wherein the second stage comprises N routing modules.

7. Switch according to claim 1 wherein the delay lines from the first stage and coupled to a common module of the second stage define time-delays that are all different from each other.

8. Switch according to claim 1 wherein the third stage comprises P passive multiplexers or couplers having N/X inputs and one output.

9. Switch according to claim 1 wherein the delay lines are in the form of optical fibers.

10. Switch according to claim 1 wherein each delay line corresponds to an integer number of packet times.

11. Switch according to claim 1 wherein for a switch comprising a number of inputs/outputs respectively equal to 16, 32 and 64, the size of some of the delay lines used is at least equal to 41, 43 and 44 packet times, respectively.

12. Switch according to claim 1 wherein the number r of blocks of Y modules of the second stage is greater than or equal to 2.m.X−1 where m represents the average time depth in packet times per input to which this switch must resolve routing conflicts.

13. Switch according to claim 1 wherein the input stage is also a space switching stage and the modules of the input stage are connected to only some modules of the second stage.

14. Switch according to claim 1 wherein P=N.

15. Switch according to claim 1 wherein P>N.

16. Switch according to claim 1 wherein r=N/X.

17. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, where N, P, X, r are positive integer numbers, a space switching second stage coupled to the output side of the delay lines of the first stage and adapted to direct the optical packets selectively to the output corresponding to the routing determined by the header of each packet, and an output third stage, wherein said switch is organized into pseudo-random access memory.

18. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of x sets, where N, P, X, r are positive integer numbers, a space switching second stage coupled to the output side of the delay lines of the first stage and adapted to direct the optical packets selectively to the output corresponding to the routing determined by the header of each packet, and an output third stage, wherein the input stage comprises N frequency converter modules, N groups of r delay lines and N wavelength-sensitive passive routing means.

19. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the first stage comprises N wavelength converter modules each adapted to transpose the wavelength of an optical packet received at one of N inputs to a wavelength selected from r available wavelengths, N groups of X sets of r/X on average delay lines respectively associated with each converter module and N respective wavelength-sensitive passive routing means at the output of each converter module to direct each packet from this module to one of the r associated delay liens according to its transposed wavelength, where N, P, X, r are positive integer numbers.

20. Switch according to claim 19 wherein in each the N groups the r delay lines are organized into X sets of r/X on average lines defining different time-delays from one line to another in each group of r delay lines.

21. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/x on average delay lines of X sets, a space switching second stage coupled to the output side of the delay lines of the first stage and adapted to direct the optical packets selectively to the output corresponding to the routing determined by the header of each packet, and an output third stage, wherein the first stage comprises N wavelength converter modules each adapted to transpose the wavelength of an optical packet received at one of the N inputs to a chosen one of r available wavelengths, N groups of r delay lines respectively associated with each converter module and N respective wavelength-sensitive passive routing means at the output of each converter module to direct each packet from this module to one of the r associated delay lines according to its transposed wavelength, where N, P, X, r are positive integer numbers.

22. Switch according to claim 21 wherein in each of the N groups the r delay lines define different time-delays from one line to another.

23. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the second stage comprises r.Y=N wavelength converter modules, r.Y groups of P/X optical lines and r.Y=N passive routing means, where N, x, r, r.y, and P are positive integer numbers.

24. Switch according to claim 23 wherein X is equal to 2 and each module of the second stage is respectively connected to an even output or to an odd output of the switch.

25. Switch according to claim 23 wherein X is equal to 1 and each module of the second stage is connected to each output of the switch.

26. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the second stage comprises N wavelength converter modules, N groups of P optical lines and N passive routing means, where N, P, X, r are positive integer numbers.

27. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the second stage comprises r blocks of Y wavelength converter modules each coupled on the input side via a multiplexer to the output of r delay liens from r inputs, each of the converter modules being adapted to transpose the wavelength of an optical packet received from a delay line to a chosen one of P/X available wavelengths, r.Y=N groups of P/X optical lines respectively associated on the input side with each converter module of the second stage and on the output side with P/X outputs of the switch and r.Y respective wavelength-sensitive passive routing means at the output of each converter module of the second stage for directing each packet from this module to one of the P/X associated optical lines according to its transposed wavelength, where N, X, r, r.y, and P are positive integer numbers.

28. Switch according to claim 27 wherein X is equal to 2 and each module of the second stage is respectively connected to an even output or to an odd output of the switch.

29. Switch according to claim 27 wherein X is equal to 1 and each module of the second stage is connected to each output of the switch.

30. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the second stage comprises N wavelength converter modules each coupled on the input side to the output of N delay lines from N respective inputs, each of the converter modules being adapted to transpose the wavelength of an optical packet received from a delay line to a chosen one of P available wavelengths, N groups of P optical lines respectively associated on the input side with each converter module of the second stage and on the output side with one of the P outputs of the switch and N respective wavelength-sensitive passive routing means at the output of each converter module of the second stage for directing each packet from this module to one of the P associated optical lines according to its transposed wavelength where N, P, x, r are positive integer numbers.

31. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the delay lines from the first stage and coupled to a common module of the second stage define time-delays that are all different from each other and wherein the delay lines from the inputs are successively assigned to each module of the second stage by circular permutation, where N, P, X, r are positive integer numbers.

32. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the delay lines from the first stage and coupled to a common module of the second stage define time-delays that are all different from each other and wherein each input $E_k$ is assigned the shortest delay line preceding the module $k$ of the second stage, then the second shortest delay line of the module k+Y of the second stage, and so on in increments of Y modules and by circular permutation through all of the N modules for each delay line length increment, where N, P, X, Y, k, r are positive integer numbers.

33. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the delay lines from the first stage and coupled to a common module of the second stage define time-delays that are all different from each other, wherein the first converter module of the second stage is preceded by the shortest delay line of the first input to the longest delay line of the last input, the second converter module of the second stage receives the longest delay line of the first input, the shortest delay line of the second input up to the second shortest delay line of the last input, and so on up to the last converter module of the second stage, where N, P, X, r are positive integer numbers.

34. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the first stage comprises N wavelength converter modules each adapted to transpose the wavelength of an optical packet received at one of the N inputs to a selected one of $r$ available wavelengths, N groups of X sets of r/X on average delay lines respectively associated with each converter module and N respective wavelength-sensitive passive routing means at the output of each converter module to direct each packet from this module to one of the $r$ associated delay lines according to its transposed wavelength, the second stage comprises $r$ blocks of Y wavelength converter modules each coupled on the input side to the output of $r$ delay lines from $r$ respective inputs, each of the r.Y converter modules of the second stage being adapted to transpose the wavelength of an optical packet received from a delay line to a chosen one of P/X available wavelengths, r.Y groups of P/X optical lines respectively associated on the input side with each converter module of the second stage and on the output side with P/X outputs of the switch and r.Y respective wavelength-sensitive passive routing means at the output of each converter module of the second stage for directing each packet from this module to one of the P/X associated optical liens according to its transposed wavelength and the third stage comprises P passive multiplexers or couplers with P/X inputs and one output, where N, X, r, Y, r.Y, and P are positive integer numbers.

35. Switch according to claim 34 wherein each input has only one port to any block off the second stage.

36. Switch according to claim 34 wherein X is equal to 2 and each module of the second stage is respectively connected to an even output or to an odd output of the switch.

37. Switch according to claim 34 wherein X is equal to 1 and each module of the second stage is connected to each output of the switch.

38. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets.

a space switching second stage coupled to the output side of the delay lines of the first stage and adapted to direct the optical packets selectively to the output corresponding to the routing determined by the header of each packet, and an output third stage, wherein each input module has a choice of x sets of outputs, i.e., x sets of delay lines, which X sets of outputs or delay lines can respectively lead via modules of the second stage, lines and output modules to X respective different groups of P/X outputs where N, P, X, r are positive integer numbers.

39. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the first N/X modules of the second stage are assigned to a first type of output, the next N/X modules of the second stage are assigned to a second type of output and so one for x types of output, where N, P, X, r are positive integer numbers.

40. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each wavelength converter module is formed by the combination of an optical amplifier and a set of lasers controlled in accordance with the required routing, where N, P, X, r are positive integer numbers.

41. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the passive routing means are formed by a diffraction grating, where N, P, X, r are positive integer numbers.

42. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the packet headers are deleted in the first stage and rewritten in the second stage where N, P, X, r are positive integer numbers.

43. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein the second stage comprises r blocks of Y=N/r sets which each include a wavelength converter module formed, for example, by a single optical amplifier coupled by a fiber to the outputs of the r associated delay liens from the first stage via a respective coupler or multiplexer having r inputs and one output, where N, P, X, r are positive integer numbers.

44. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each module i of the second stage addresses a type of output $s_i$ defined by the equation:

$$x_i = E((i-1)X/N)+1, (x_i=1,X),$$

where N, P, r, i and E are positive integer numbers.

45. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each module i of the second stage can access $s_i$ outputs defined by the equation:

$$s_i = x_i + (q-1)X, (q=1,P/X),$$

where N, P, X, r, $x_i$ and q are positive integer numbers, for alternating types of output.

46. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each module i of the second stage is preceded by r delay lines associated with the inputs:

$$k=(i-pY-1)N+1, (p=0, r-1),$$

where N, P, X, r, i, Y and p are positive integer numbers.

47. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each input $E_k$ of the switch addresses modules $i$ of the second stage via delay lines:

$$i=(k+pY-1)N+1, (p=0,r-1)$$

the length of the delay lines increasing with p and corresponding to an integer number of packets between 1 and L, where N, P, r, X, k, Y, p and L are positive integer numbers.

48. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packet require access to the same output simultaneously, wherein said optical switch comprises three stages:

a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each module $i$ of the second stage can access $s_i$ outputs defined by the equation:

$$s_i=(x_i-1)(P/X)+q, (q=1,P/X),$$

where N, P, X, r, i, x and q are positive integer numbers.

49. Optical switch having N inputs and P outputs for optical signals organized into packets each comprising a header containing information relating to the routing of each packet and a payload, which switch comprises:

means for reading the header of each optical packet and for identifying the corresponding routing, orientation and coupling means for directing each packet arriving at any input to the output corresponding to the routing determined by the header of the packet, and delay lines through which the optical signals pass selectively in order to manage routing conflicts arising when a plurality of packets require access to the same output simultaneously, wherein said optical switch comprises a time switching first stage adapted to direct each optical packet received at an input to a chosen delay line, to assign to each packet a time-delay enabling time reorganization of the packets in order to avoid routing conflicts, the first stage comprising N groups of X sets of r/X on average delay lines and N routing modules adapted to direct each received optical packet to a chosen one of the r/X on average delay lines of X sets, a space switching second stage coupled to the output side of the delay lines of the first stage and adapted to direct the optical packets selectively to the output corresponding to the routing determined by the header of each packet, and an output third stage, wherein each module i of the second stage can access $s_i$ outputs defined by the equation:

$$s_i=x_i+(q-1)X, (q=1,P/X),$$

where N, P, X, r, i, x and q are positive integer numbers for two alternating types of output that are respectively even and odd.

* * * * *

UNITED STATES PATENT AND TRADEMARK OFFICE
CERTIFICATE OF CORRECTION

PATENT NO. : 5,734,486
DATED : March 31, 1998
INVENTOR(S) : Guillemot et al.

It is certified that error appears in the above-identified patent and that said Letters Patent is hereby corrected as shown below:

In column 2, at line 17, please delete "mimes" and insert --times--.

Signed and Sealed this

Thirteenth Day of July, 1999

Attest:

Q. TODD DICKINSON

*Attesting Officer*

*Acting Commissioner of Patents and Trademarks*